United States Patent
Kim

(10) Patent No.: US 12,494,941 B2
(45) Date of Patent: Dec. 9, 2025

(54) APPARATUS FOR COMMUNICATIONS FOR AN ELECTRONIC MECHANICAL BRAKE SYSTEM

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 88 days.

(21) Appl. No.: 18/413,355

(22) Filed: Jan. 16, 2024

(65) Prior Publication Data

US 2024/0356777 A1 Oct. 24, 2024

(30) Foreign Application Priority Data

Apr. 20, 2023 (KR) ........................ 10-2023-0051877

(51) Int. Cl.
*H04L 12/40* (2006.01)
*B60W 30/18* (2012.01)

(52) U.S. Cl.
CPC . *H04L 12/40176* (2013.01); *B60W 30/18109* (2013.01); *H04L 2012/40215* (2013.01)

(58) Field of Classification Search
CPC .... H04L 12/40176; H04L 2012/40215; B60W 30/18109; B60T 2220/04; B60T 2270/413; B60T 2270/406; B60T 2270/82; B60T 8/3255; B60T 8/885; B60T 7/042
See application file for complete search history.

(56) References Cited

U.S. PATENT DOCUMENTS

| | | | | |
|---|---|---|---|---|
| 6,390,571 | B1* | 5/2002 | Murphy | B60T 13/662 303/14 |
| 2002/0180270 | A1* | 12/2002 | Heckmann | H04L 69/40 307/10.1 |
| 2011/0320099 | A1* | 12/2011 | Kim | B60T 13/746 701/70 |
| 2017/0240148 | A1* | 8/2017 | Kotera | B60T 8/17 |
| 2022/0055588 | A1* | 2/2022 | Kim | B60T 8/92 |
| 2022/0111824 | A1* | 4/2022 | Kim | B60T 7/042 |
| 2022/0239526 | A1* | 7/2022 | Nemeth | H04L 12/40182 |

* cited by examiner

*Primary Examiner* — George C Jin
(74) *Attorney, Agent, or Firm* — Morgan, Lewis & Bockius LLP

(57) ABSTRACT

An apparatus for communication for use in an electronic mechanical brake system for braking a vehicle by using electronic mechanical brakes respectively disposed on a left front wheel disposed on the front left side of the vehicle, a right front wheel disposed on the front right side of the vehicle, a left rear wheel disposed on the rear left side of the vehicle, and a right rear wheel disposed on the rear right side of the vehicle, comprising: a main control unit for controlling braking of the vehicle by transmitting a braking command to each of the electronic mechanical brakes; a wheel control unit disposed on each of the electronic mechanical brakes; a first local CAN forming a communication channel through which braking commands are transmitted and received between the main control unit and the wheel control unit; and a second local CAN forming a communication channel between the main control unit and the wheel control unit to secure communication redundancy of the vehicle with the first local CAN.

13 Claims, 3 Drawing Sheets

|  | FRONT LEFT WHEEL CONTROL UNIT | FRONT RIGHT WHEEL CONTROL UNIT | REAR RIGHT WHEEL CONTROL UNIT | REAR LEFT WHEEL CONTROL UNIT |
|---|---|---|---|---|
| FIRST PIN | LC1H | LC2H | LC1H | LC2H |
| SECOND PIN | LC1L | LC2L | LC1L | LC2L |
| THIRD PIN | LC2H | LC1H | LC2H | LC1H |
| FOURTH PIN | LC2L | LC1L | LC2L | LC1L |

※ LC1H : FIRST LOCAL CAN HIGH LINE, LC1L : FIRST LOCAL CAN LOW LINE
  LC2H : SECOND LOCAL CAN HIGH LINE, LC2L : SECOND LOCAL CAN LOW LINE

*FIG. 3*

APPARATUS FOR COMMUNICATIONS FOR AN ELECTRONIC MECHANICAL BRAKE SYSTEM

CROSS-REFERENCE TO RELATED APPLICATION

The present application claims the benefit under 35 USC § 119 (a) of Patent Application No. 10-2023-0051877, filed on Apr. 20, 2023, in Korea, the entire disclosure of which is incorporated herein by reference for all purposes.

TECHNICAL FIELD

The present disclosure relates to an apparatus for communication for an electronic mechanical brake system.

BACKGROUND

The contents described in this section are only about background information on the present disclosure and do not make up prior art.

An electronic mechanical brake system brakes a vehicle using a main control unit and a plurality of wheel control units. The main control unit issues a braking command using a pedal sensor based on a driver's desired braking value. The plurality of wheel control units each receive a braking command from the main control unit and generate a braking force for each wheel using an electric braking motor. The plurality of wheel control units respectively issue a braking command and generate a braking force for each wheel.

The electronic mechanical brake system transmits and receives braking commands for braking, such as braking signals and backup braking signals, using controller area network (CAN) communication, etc. between the main control unit and the wheel control unit.

The CAN communication forms a communication channel using a main line and a stub line. The two electronic control units that make up the main line forms a termination resistance. Even when the length of a wiring harness of the main line exceeds a certain length, no problem occurs. On the other hand, an electronic control unit that transmits and receives braking commands using a stub line does not include a termination resistance, and it is not possible for the length of a wiring harness of a stub line to exceed a certain length.

The apparatus for communication for an electronic mechanical brake system according to the prior art includes a first local CAN and a second local CAN to secure communication redundancy. The first local CAN and the second local CAN each include a main line and a stub line to transmit and receive signals between a main control unit and a plurality of wheel control units. Here, the first local CAN and the second local CAN are connected to termination resistances formed in a first main control unit and a second main control unit using their respective main lines. In addition, through a stub line, the main line of each of the first local CAN and the second local CAN is connected to the plurality of wheel control units.

In the case of the conventional apparatus for communication for an electronic mechanical brake system described above, there is a problem in that braking commands cannot be transmitted and received between the first and second main control units and the plurality of wheel control units when an abnormality such as physical damage or deformation occurs in either the first main control unit or the second main control unit. For example, if a problem occurs in the first main control unit, the function of the first main control unit itself is lost. In addition, the function of a termination resistance formed in the first main control unit is lost, so the first local CAN connected to the first main control unit cannot function normally and the second local CAN connected to the second main control unit cannot function normally, either. As a result, there is a problem in that a backup braking command cannot be transmitted to the plurality of wheel control units even when the second main control unit issues the backup braking command.

SUMMARY

In the case of the apparatus for communication for the electronic mechanical brake system according to an embodiment of the present disclosure, the termination resistances of the first local CAN and the second local CAN are formed in each of the plurality of wheel control units, so that the stability of communications between the main control unit and the plurality of wheel control units is secured.

The problems to be addressed by the present disclosure are not limited to the above-mentioned problems, and the following description will allow a person having ordinary skill in the art to clearly understand other problems not mentioned above.

In the case of the apparatus for communication for the electronic mechanical brake system according to an embodiment of the present disclosure, the termination resistances of the first local CAN and the second local CAN are formed in each of the plurality of wheel control units, so that it may be possible to secure the stability of communications between the main control unit and the plurality of wheel control units.

BRIEF DESCRIPTION OF THE DRAWINGS

FIG. 3 is a table showing an example of a pin map of each wheel control unit and the first and second local CANs.

DETAILED DESCRIPTION

Figure 1:
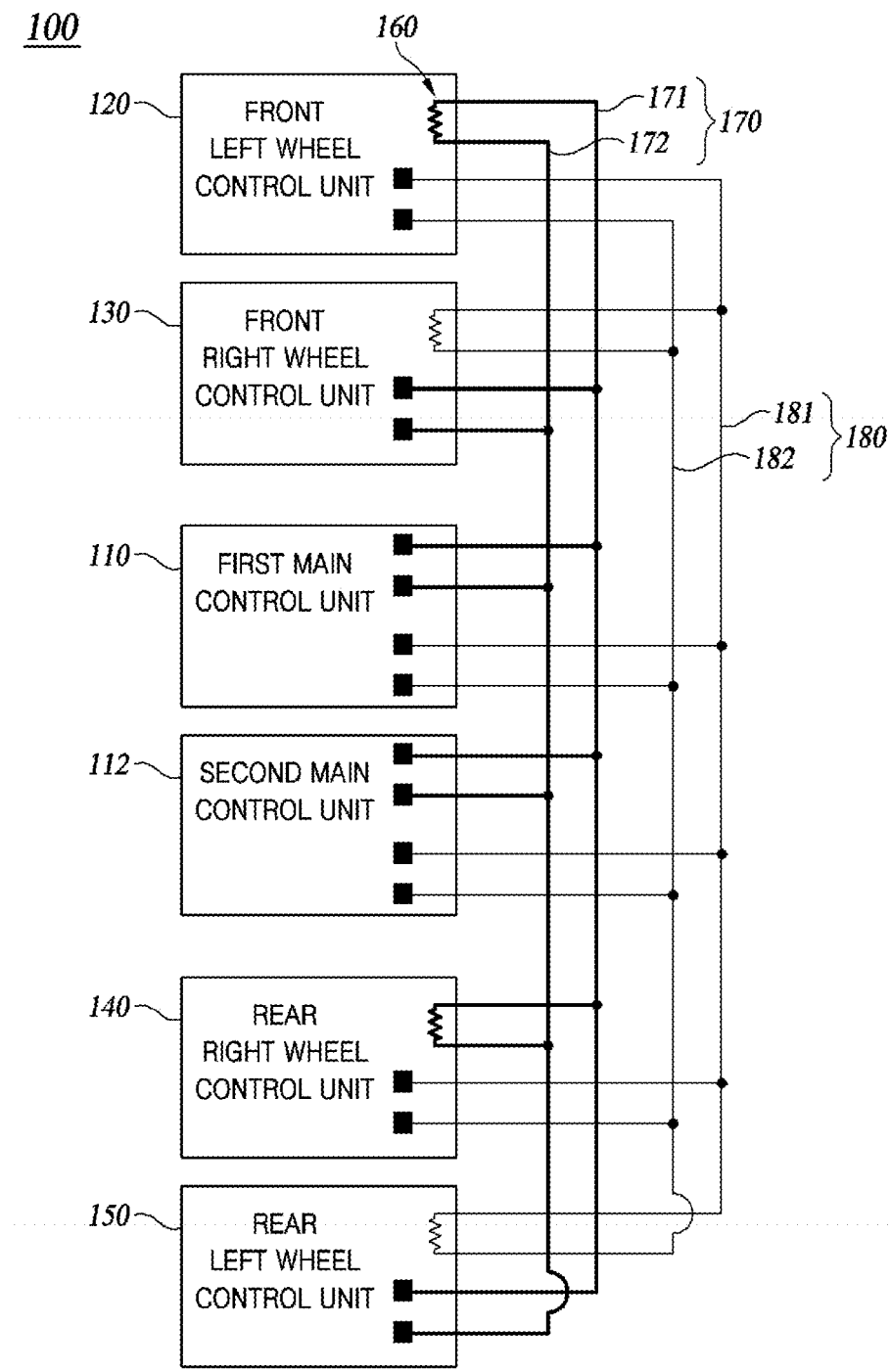
FIG. 1 is a view of an apparatus for communication between a main control unit and each wheel control unit of an electronic mechanical brake system.

FIG. 1 is a view of an apparatus for communication between a main control unit and each wheel control unit of an electronic mechanical brake system.

Figure 2:
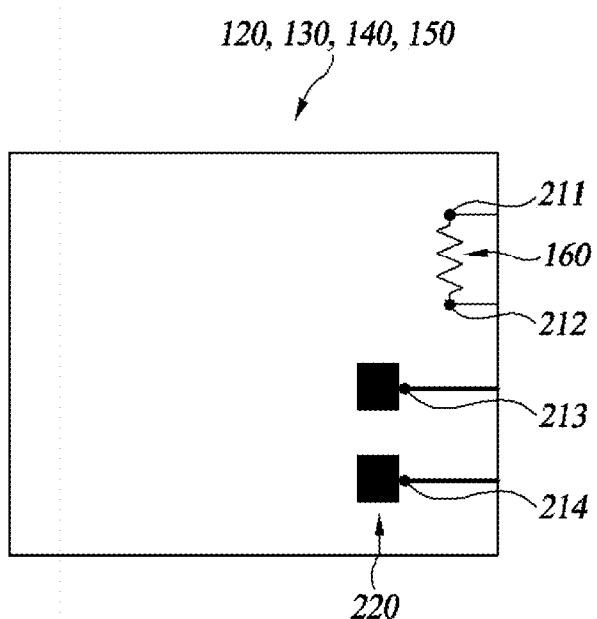
FIG. 2 is a view of a pin map of the wheel control unit.

FIG. 2 is a view of a pin map of the wheel control unit.

Referring to FIGS. 1 and 2, an apparatus for communication for use in the electronic mechanical brake system according to an embodiment of the present disclosure may include some or all of a first main control unit 110, a second main control unit 112, a front left wheel control unit 120, a front right wheel control unit 130, a rear right wheel control unit 140, a rear left wheel control unit 150, a first main line 170, and a second main line 180.

The first main control unit 110 and the second main control unit 112 may transmit braking commands to each wheel. Here, the second main control unit 112 may be a backup controller of the first main control unit 110. When an abnormality such as physical damage or deformation occurs in the first main control unit 110, the second main control unit 112 may issue a backup braking command necessary for braking a vehicle and transmit the backup braking command to each wheel.

The first main control unit 110 and the second main control unit 112 may transmit and receive information on the driving condition of the vehicle, etc. with the wheel control units 120, 130, 140, and 150 placed on each wheel by using a first local CAN and a second local CAN. For example, the first main control unit 110 and the second main control unit 112 may transmit a braking command to the front left wheel control unit 120, the front right wheel control unit 130, the rear right wheel control unit 140, and the rear left wheel control unit 150 by using the first local CAN or the second local CAN.

Electronic mechanical brakes (not shown) may be disposed on each of a front left wheel, a front right wheel, a rear right wheel, and a rear left wheel of a vehicle. The electronic mechanical brake placed on each wheel may generate a braking force required for a vehicle based on braking commands from each of the front left wheel control unit 120, the front right wheel control unit 130, the rear right wheel control unit 140, and the rear left wheel control unit 150. The front left wheel control unit 120, the front right wheel control unit 130, the rear right wheel control unit 140, and the rear left wheel control unit 150 may independently determine a braking force required for each wheel even when not receiving a braking command from the first main control unit 110 and the second main control unit 112. Here, the braking command may include information about a desired braking value required for each wheel. The desired braking value refers to a braking force required for each wheel to continuously maintain the posture of a vehicle that is driving and to prevent slippage during braking of the vehicle.

The front left wheel control unit 120, the front right wheel control unit 130, the rear right wheel control unit 140, and the rear left wheel control unit 150 may respectively receive a braking command issued by the first main control unit 110 and the second main control unit 112 via the first local CAN or the second local CAN, and may generate a braking force for each wheel based on each received braking command. Here, the front left wheel control unit 120, the front right wheel control unit 130, the rear right wheel control unit 140, and the rear left wheel control unit 150 may be a brake wheel control unit (BWCU). The front left wheel control unit 120, the front right wheel control unit 130, the rear right wheel control unit 140, and the rear left wheel control unit 150 may each include a termination resistance 160. Specifically, the front left wheel control unit 120 and the rear right wheel control unit 140 may make up the termination resistance 160 of the first local CAN. The front right wheel control unit 130 and the rear left wheel control unit 150 may make up the termination resistance 160 of the second local CAN. Here, the termination resistance 160 may be connected to at least two of a plurality of input pins. Therefore, the first local CAN according to an embodiment of the present disclosure may form the first main line 170 by forming the termination resistance 160 of each of the front left wheel control unit 120 and the rear right wheel control unit 140. In addition, the second local CAN may form the second main line 180 by forming the termination resistance 160 of each of the front right wheel control unit 130 and the rear left wheel control unit 150.

The first local CAN may form a communication channel using the first main line 170. The second local CAN may form a backup communication channel using the second main line 180.

The first local CAN may form a communication channel between the front left wheel control unit 120 and the rear right wheel control unit 140. The communication channel of the first local CAN may be formed using the first main line 170. The front right wheel control unit 130 and the rear left wheel control unit 150 may be each connected to the first main line 170 of the first local CAN through a stub line. Here, the communication channel of the first local CAN may be a main channel.

The second local CAN may form a communication channel between the front right wheel control unit 130 and the rear left wheel control unit 150. The communication channel of the second local CAN may be formed using the second main line 180. The front left wheel control unit 120 and the rear right wheel control unit 140 may be each connected to the second main line 180 of the second local CAN through a stub line. Here, the communication channel of the second local CAN may be a backup channel of the first local CAN.

The first main line 170 and the second main line 180 may respectively include a high line and a low line. The first main line 170 may include a first local CAN high line 171 and a first local CAN low line 172. The second main line 180 may include a second local CAN high line 181 and a second local CAN low line 182.

Through the first main line 170, the first local CAN according to an embodiment of the present disclosure may be connected to the termination resistance 160 disposed in any one of the front left wheel control unit 120 and the front right wheel control unit 130 disposed at the front of a vehicle. The first local CAN may be connected to the termination resistance 160 disposed in either the rear right wheel control unit 140 or the rear left wheel control unit 150 disposed at the rear of the vehicle. Here, when one end of the first local CAN is connected to the termination resistance 160 of the front left wheel control unit 120, the other end of the first local CAN may be connected to the termination resistance 160 of the rear right wheel control unit 140 disposed diagonally from the front left wheel control unit 120 based on how the wheels of the vehicle are arranged, forming the first main line 170. When the first main line 170 is connected to the termination resistances 160 of the front left wheel control unit 120 and the rear right wheel control unit 140, through the second main line 180, one end of the second local CAN may be connected to the termination resistance 160 of the front right wheel control unit 130 based on how the wheels of the vehicle are arranged, and the other end of the second local CAN may be connected to the termination resistance 160 of the rear left wheel control unit 150 disposed diagonally.

The yaw moment of a vehicle braking only with a left front wheel and a right front wheel may be greater than the yaw moment of a vehicle braking only with a right rear wheel and a left rear wheel. As the yaw moment increases, the stability of braking of a vehicle may decrease. Therefore, when an error occurs in either the first local CAN or the second local CAN, it may be desirable to brake the vehicle using a pair of wheels arranged diagonally among the left front wheel, the right front wheel, the left rear wheel, and the right rear wheel. Accordingly, it may be desirable that the first local CAN and the second local CAN are respectively connected to the termination resistances 160 of a pair of wheel control units arranged diagonally among the front left wheel control unit 120, the front right wheel control unit 130, the rear right wheel control unit 140, and the rear left wheel control unit 150 of a vehicle.

When an error occurs in the first local CAN connected to the front left wheel control unit 120 and the rear right wheel control unit 140, any one of the first main control unit 110, the second main control unit 112, the front right wheel control unit 130, and the rear left wheel control unit 150 may issue a backup braking command and generate a braking force for an electronic mechanical brake of a right front wheel and an electronic mechanical brake of a left rear wheel based on the issued backup braking command.

The front left wheel control unit 120, the front right wheel control unit 130, the rear right wheel control unit 140, and the rear left wheel control unit 150 may respectively include a plurality of input pins. For example, the front left wheel control unit 120, the front right wheel control unit 130, the rear right wheel control unit 140, and the rear left wheel control unit 150 may each include a first pin 211, a second pin 212, a third pin 213, and a fourth pin 214. At least two of the first to fourth pins 211 to 214 may be connected to the termination resistances 160 of the first main line 170 and the second main line 180. The remaining two of the first to fourth pins 211 to 214 may be connected to the first main line 170 and the second main line 180 through a stub line. For example, the first pin 211 and the second pin 212 of each of the front left wheel control unit 120, the front right wheel control unit 130, the rear right wheel control unit 140, and the rear left wheel control unit 150 may be connected to the termination resistances 160 of the first main line 170 and the second main line 180. The third pin 213 and the fourth pin 214 of each of the front left wheel control unit 120, the front right wheel control unit 130, the rear right wheel control unit 140, and the rear left wheel control unit 150 may be connected to the first main line 170 and the second main line 180 through a stub line. According to an embodiment of the present disclosure, the termination resistances 160 of each of the front left wheel control unit 120, the front right wheel control unit 130, the rear right wheel control unit 140, and the rear left wheel control unit 150 may be connected to the first pin 211 and the second pin 212. In addition, the first local CAN or the second local CAN may be connected to the third pin 213 and the fourth pin 214 of each of the front left wheel control unit 120, the front right wheel control unit 130, the rear right wheel control unit 140, and the rear left wheel control unit 150.

In other words, the front left wheel control unit 120, the front right wheel control unit 130, the rear right wheel control unit 140, and the rear left wheel control unit 150 may have a unified arrangement of the first to fourth pins 211 to 214 connected to the first local CAN and the second local CAN. Therefore, it may be possible to replace one of the front left wheel control unit 120, the front right wheel control unit 130, the rear right wheel control unit 140, and the rear left wheel control unit 150 with another one, so that it may be possible to reduce the cost of manufacturing the electronic mechanical brake system.

FIG. 3 is a table showing an example of a pin map of each wheel control unit and the first and second local CANs.

Referring to FIGS. 1 to 3, the apparatus for communication for use in the electronic mechanical brake system according to an embodiment of the present disclosure may have a dualized pin map of the front left wheel control unit 120, the front right wheel control unit 130, the rear right wheel control unit 140, and the rear left wheel control unit 150.

According to an embodiment of the present disclosure, the same communications channel may be connected to the first to fourth pins 211 to 214 of each of the front left wheel control unit 120 and the rear right wheel control unit 140. For example, the first local CAN high line 171 may be connected to the first pin 211 of each of the front left wheel control unit 120 and the rear right wheel control unit 140, and the first local CAN low line 172 may be connected to the second pin 212 of each of the front left wheel control unit 120 and the rear right wheel control unit 140. The second local CAN high line 181 may be connected to the third pin 213 of each of the front left wheel control unit 120 and the rear right wheel control unit 140, and the second local CAN low line 182 may be connected to the fourth pin 214 of each of the front left wheel control unit 120 and the rear right wheel control unit 140. Here, the front left wheel control unit 120 and the rear right wheel control unit 140 may make up the first main line 170 of the first local CAN.

The same communication channel may be connected to the first to fourth pins 211 to 214 of the front right wheel control unit 130 and the rear left wheel control unit 150 according to an embodiment of the present disclosure. For example, the second local CAN high line 181 may be connected to the first pin 211 of each of the front right wheel control unit 130 and the rear left wheel control unit 150, and the second local CAN low line 182 may be connected to the second pin 212 of each of the front right wheel control unit 130 and the rear left wheel control unit 150. The first local CAN high line 171 may be connected to the third pin 213 of each of the front right wheel control unit 130 and the rear left wheel control unit 150, and the first local CAN low line 172 may be connected to the fourth pin 214 of each of the front right wheel control unit 130 and the rear left wheel control unit 150. Here, the front right wheel control unit 130 and the rear left wheel control unit 150 may make up the second main line 180 of the second local CAN.

What is claimed is:

1. An apparatus for communication for use in an electronic mechanical brake system for braking a vehicle by using electronic mechanical brakes respectively disposed on a left front wheel disposed on a front left side of the vehicle, a right front wheel disposed on a front right side of the vehicle, a left rear wheel disposed on a rear left side of the vehicle, and a right rear wheel disposed on a rear right side of the vehicle, comprising:
   a main control unit for controlling braking of the vehicle by transmitting a braking command to each of the electronic mechanical brakes;
   each of wheel control units disposed on each of the electronic mechanical brakes;
   a first local CAN forming a communication channel through which braking commands are transmitted and received between the main control unit and the wheel control units; and
   a second local CAN forming a communication channel between the main control unit and the wheel control units to secure communication redundancy of the vehicle with the first local CAN, wherein termination resistances of the first local CAN and the second local CAN are formed in the wheel control units.

2. The apparatus of claim 1, wherein a communication channel based on the first local CAN is a main channel, and a communication channel based on the second local CAN is a backup channel of the first local CAN.

3. The apparatus of claim 1, wherein the wheel control units include a front left wheel control unit for controlling a respective electronic mechanical brake disposed on the left front wheel, a front right wheel control unit for controlling a respective electronic mechanical brake disposed on the right front wheel, a rear left wheel control unit for controlling a respective electronic mechanical brake disposed on the left rear wheel, and a rear right wheel control unit for controlling a respective electronic mechanical brake disposed on the right rear wheel.

4. The apparatus of claim 3, wherein: the wheel control units respectively include a first pin, a second pin, a third pin, and a fourth pin; a termination resistance of the first local CAN or the second local CAN is formed on at least two of the first to fourth pins, adjacent to each other; and a main line of the first local CAN or the second local CAN is connected to remaining two of the first to fourth pins.

5. The apparatus of claim 4, wherein the wheel control units have a unified pin map of the first to fourth pins.

6. The apparatus of claim 4, wherein, based on how wheels of the vehicle are arranged, the first local CAN forms a first main line on termination resistances of a pair of wheel control units arranged diagonally among the front left wheel control unit, the front right wheel control unit, the rear right wheel control unit, and the rear left wheel control unit.

7. The apparatus of claim 4, wherein the second local CAN forms a second main line on termination resistances of another pair of wheel control units arranged diagonally among the front left wheel control unit, the front right wheel control unit, the rear right wheel control unit, and the rear left wheel control unit.

8. The apparatus of claim 6, wherein the first main line includes a first local CAN high line and a first local CAN low line.

9. The apparatus of claim 7, wherein the second main line includes a second local CAN high line and a second local CAN low line.

10. The apparatus of claim 6, wherein the third pin and the fourth pin of each of the front right wheel control unit and the rear left wheel control unit are connected to the first main line through a stub line.

11. The apparatus of claim 7, wherein the third pin and the fourth pin of each of the front left wheel control unit and the rear right wheel control unit are connected to the second main line through a stub line.

12. The apparatus of claim 3, wherein, when an error has occurred in at least one of the front left wheel control unit, the front right wheel control unit, the rear right wheel control unit, and the rear left wheel control unit, the first local CAN and the second local CAN transmit and receive a backup braking command issued by at least one of the wheel control units, in which no error has occurred, or transmit and receive a backup braking command issued by the main control unit.

13. The apparatus of claim 1, wherein, when an error has occurred in any one of the first local CAN and the second local CAN, the main control unit and the wheel control units transmit and receive the braking command by using at least one of the first local CAN and the second local CAN, in which no abnormality has occurred.

* * * * *